April 24, 1962 E. SCHNITZER 3,031,182
BAND PASS SHOCK ABSORBER
Original Filed Sept. 30, 1957
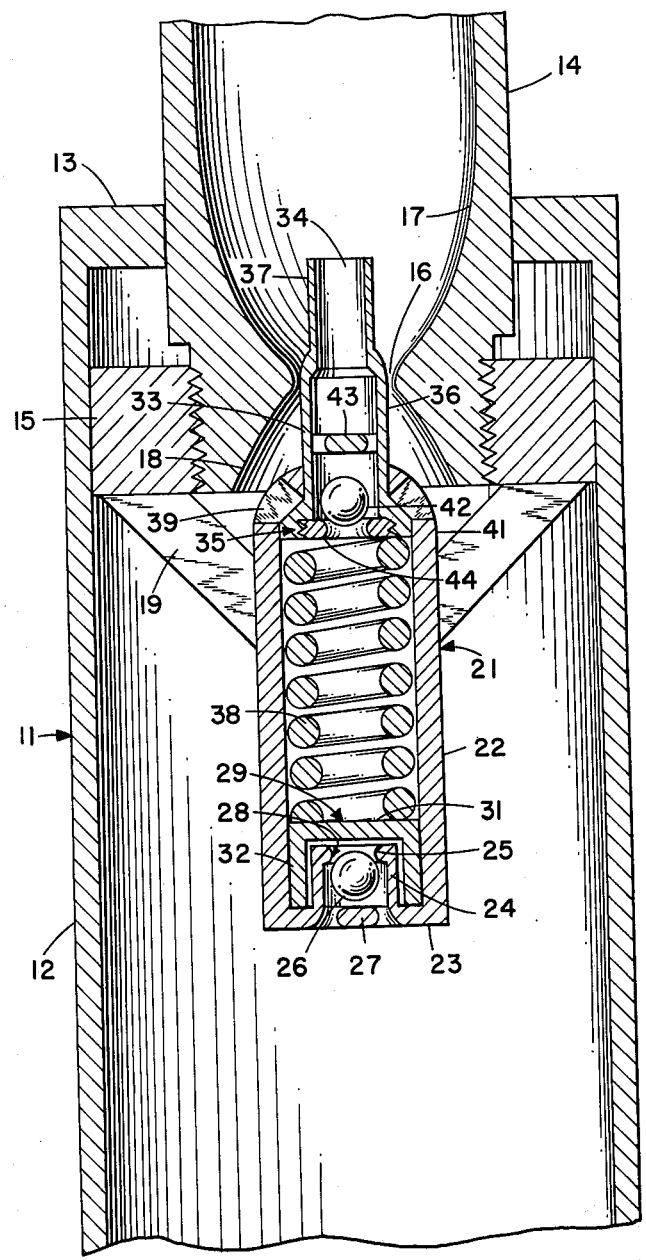
INVENTOR
EMANUEL SCHNITZER
BY
ATTORNEYS United States Patent Office 3,031,182
Patented Apr. 24, 1962

3,031,182
BAND PASS SHOCK ABSORBER
Emanuel Schnitzer, 926 19th St., Newport News, Va.
Original application Sept. 30, 1957, Ser. No. 687,310, now Patent No. 2,928,670, dated Mar. 15, 1960. Divided and this application Mar. 7, 1960, Ser. No. 13,398
1 Claim. (Cl. 267—64)
(Granted under Title 35, U.S. Code (1952), sec. 266)

The invention described herein may be manufactured and used by or for the Government of the United States of America for governmental purposes without the payment of any royalties thereon or therefor.

This application is a division of my copending application Serial No. 687,310, filed September 30, 1957, issued March 15, 1960 as Patent No. 2,928,670, which in turn is a continuation-in-part of my copending application Serial No. 528,563, filed August 15, 1955, now Patent No. 2,866,633.

This invention relates to shock struts for machine elements and the like with particular application to shock absorbers including a piston slidable in a fluid containing cylinder. In conventional shock absorbers of this type, when the piston moves under compression in the cylinder, the fluid is forced through a small orifice in the piston, giving rise to a damping action which is roughly proportional to the square of the relative velocity of piston and cylinder. It is apparent, therefore, that the higher the disturbance frequency or time rate of change of loading, the more resistance the absorber exhibits to relative motion until at high frequencies it is, in effect, a rigid link.

One of the primary objects of the invention is to filter out, in a shock absorber, loads from disturbances in certain frequency ranges or having certain rates of application while retaining the required load arresting characteristics of conventional shock absorbers in the remainder of the frequency spectrum.

Another object is to provide simplified and improved means for placing the primary object of the invention into effect.

Another object of the invention is to provide means for utilizing the metering pin of the piston in a conventional piston-cylinder type shock absorber, both as a control by telescoping displacement and as a load filtering device by virtue of its hollow construction permitting fluid flow therethrough.

Still another object is to provide a shock absorber sensitive not only to displacement of the coacting parts but to the frequency of the relative movement of the parts.

A further object is to provide an arrangement in shock absorbers in which parts may be removed, replaced or adjusted without the necessity of complete disassembly of the shock absorber strut.

Other objects and many of the attendant advantages of this invention will be readily appreciated as the same becomes better understood by reference to the following detailed description when considered in connection with the solitary figure of the accompanying drawing wherein is shown a fragmentary longitudinal sectional view of the shock absorber with the metering pin fixed to and depending from the piston head within the cylinder.

Referring now to the drawing, a shock absorber 11 is shown adapted for insertion between two relatively movable machine parts, not shown, such as an airplane body and a supporting wheel, and which utilizes the hollow type pin for fluid flow. The hollow shock absorber lower cylinder 12, which is filled with a fluid, not shown, such as oil, at its open upper end, is provided with an inner flange 13 with a coaxial cylindrical surface on its inner side for sliding engagement with the outer wall of the hollow shock absorber upper piston cylinder 14, which is partially filled with fluid overflow from cylinder 12, and partially filled with a gas, such as air. In turn, the lower open end of piston 14 is provided with a terminal external flange 15, screwthreaded to the piston, the outer flange surface being cylindrical and forming a sliding contact with the inner wall of hollow cylinder 12. These two flanges 13 and 15 form terminal walls for a variable sized chamber which serves as a load rate sensitive buffing means as described in my copending application Serial No. 686,800, filed September 25, 1957, now Patent No. 2,947,386, issued August 2, 1960.

The lower open end of the piston is formed internally as a nozzle with a restricted orifice 16 and upper and lower diverging sections 17 and 18. Supported from piston flanges 15 by a spider 19 is a control unit 21. This unit has a main cylindrical section 22 coaxial with the absorber cylinder 12 and extending directly below piston orifice 16. The section 22 is hollow and at its lower end is formed with an inner flange 23 defining a tubular section end closure wall, terminating in a reversed terminal valve cylinder 24 of reduced diameter, the inner free end of this terminal cylinder, in turn, being formed with a radial valve seat 25 for a check valve ball 26. The terminal cylinder 24 forms a housing for the ball 26, a stop bar 27 being fixed across the open cylinder end to retain the ball in place. The valve seat 25, at one point, is provided with a small axial edge duct 28 which serves to permit liquid flow through valve 25, 26 when the ball is seated in closed position. Overlying the terminal valve unit 25, 26 is a piston 29 having a main transverse pressure surface plate 31 extending across the control cylinder 22 directly above the terminal valve and a cylindrical skirt 32 normally surrounding the terminal valve cylinder 24, the outer skirt surface having sliding engagement with the inner surface of control cylinder 22 forming a leak resistant obstruction to fluid flow between the opposed faces of pressure surface plate 31, and the open end of the skirt resting on the terminal flange 23 of the control unit.

The upper end of control cylinder 22 is constructed to form a terminal opening of a diameter less than that of the control cylinder and a plunger or pin 33 is slidably mounted in this opening so that it projects above cylinder 22 into and through the main piston orifice 16. This plunger is hollow to form a passage 34, and the lower plunger end, inside control cylinder 22, is expanded to form a second piston 35, this piston having a cylindrical side wall slidably engaging the upper inner surface of the control cylinder. The plunger is constructed in two sections, a lower section 36 having a diameter such that when the plunger is in its uppermost position the flow area in piston orifice 16 is at its minimum value, and an upper section 37 of lesser diameter such that, when the plunger is moved downwardly, it will permit an increased flow of liquid through orifice 16. A coil spring 38 is positioned inside the control cylinder 22 for energizing both piston 29 and piston 35 and normally holds both pistons at the outer limits of movement, as shown.

Annular ports 39 are placed radially around the construction 41 at the top of the control cylinder 22. A check valve of the ball type similar to lower valve 25, 26 is provided at the base of the pin inside the control cylinder. This valve includes a ball 42 movable in the pin between an upper stop bar 43 and the valve seat 44 formed of a curved inwardly projecting flange at the lower end of the pin.

The operation of the strut will now be described. When the two piston and receiving cylinders 12 and 14 are telescoped together with a slowly increasing velocity, the pressure in the receiving cylinder 12 builds up at a slow rate, forcing fluid through the main orifice 16 around the plunger 33 into the piston cylinder 14. Fluid pressure is, also applied to the top piston 35 in control cylinder 22, thus tending to push this piston downwardly; and the valve ball 26 in the bottom piston is moved upwardly to close valve 25, 26. However, since the pressure rise is gradual, fluid is able to flow through valve seat slot 28 at a rate large enough to force piston 29 upwardly, compressing spring 38 and thus maintaining the plunger 33 in its up equilibrium position. Fluid trapped between plunger 33 and piston 29 is forced upward through the ball valve 42, 44 and hollow plunger duct 34 to the piston cylinder 14. It is thus apparent that, for slow rates of load application, the low pass shock absorber of the instant invention behaves as a conventional fixed orifice shock absorber.

When the force or motion is applied rapidly to the shock absorber, fluid cannot flow fast enough through duct 28 to move piston 29 upwardly to balance the downward force applied to plunger piston 35 through port 39. Consequently, plunger 33 moves downwardly so that the upper plunger section of reduced diameter is positioned within main orifice 16. This allows a rapid flow of fluid through the main orifice 16 permitting the strut to telescope rapidly and preventing development of a large load in the shock absorber.

When the direction of the telescoping motion is reversed so that the shock strut tends to extend, the pressure in the lower strut cylinder drops off while that in the upper piston cylinder, by virtue of the compressed air in the cylinder, remains high. Thus, the pressure applied through ports 39 drops off and the pressure applied upward on the lower check valve ball 26 also drops off, allowing this ball to drop down, thus opening this valve. At the same time, fluid from the upper piston cylinder 14 is forced downward through plunger 33, forcing ball 42 downward to close the upper check valve. The downward pressure of upper cylinder 14 on plunger 33 forces the plunger downwardly, compressing spring 38 with the result that piston 29 is rapidly moved in a downward direction, thus moving fluid through the lower check valve 25, 26 into the lower cylinder 12. This positions section 37 of plunger 33 in orifice 16, allowing fluid in the upper cylinder 14 to be returned in increased volume through orifice 16 into the lower cylinder. When the shock strut has reached the fully extended condition, the loading differential between plunger piston 35 and piston 29 disappears, allowing the compressed spring 38 to reextend and return plunger 33 to its equilibrium position. Thus, the strut is allowed to expand rapidly in order to re-cycle itself for subsequently applied load pulses having low or high rates of loading.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

A shock absorber for connection between two machine parts, comprising a hollow cylinder partially filled with fluid forming a piston connectable to one part, a hollow fluid filled cylinder forming a receiver connectable to the other part, said piston having telescoping connection with said receiver, a piston head having a main orifice therein at the compression end of said piston, a hollow plunger forming a fluid passage way and having a free open end positioned in said main orifice, a cylindrical section mounted adjacent said piston head in one of said cylinders, said plunger having sliding connection within one end of said cylindrical section in continuation thereof, the extremity of said plunger within said cylindrical section being of enlarged diameter and forming a plunger piston, said one end of said cylindrical section surrounding said plunger between said plunger free end and said plunger extremity of enlarged diameter being of reduced diameter and provided with at least one opening for fluid communication between said one of said cylinders and said plunger piston, a piston slidingly movable in the other end of said cylindrical section, a closure wall at the other end of said cylindrical section beyond said cylindrical section piston, a main opening in said closure wall, a valve mounted adjacent said opening and adapted to close said opening with development of fluid pressure in said one of said cylinders, a bleed orifice in said closure wall, and a spring placed in said cylindrical section between said plunger and said cylindrical section piston.

References Cited in the file of this patent
UNITED STATES PATENTS
2,570,362   Mercier _____ Oct. 9, 1951